March 9, 1937.  P. TORCHET  2,073,356

ELECTRODE SUSPENSION

Filed April 18, 1933

Inventor
PIERRE TORCHET
By Dorsey & Cole
Attorney

Patented Mar. 9, 1937

2,073,356

UNITED STATES PATENT OFFICE 2,073,356

ELECTRODE SUSPENSION

Pierre Torchet, Riouperoux, France, assignor to Det Norske Aktieselskab for Elektrokemisk Industri, Oslo, Norway Application April 18, 1933, Serial No. 666,761

8 Claims. (Cl. 13—15)

The present invention relates to the so-called Söderberg electrodes which are baked while in use in the electric furnace and consist of a baked and an unbaked part. One object of the invention is a new and improved form of such electrodes for use in the electrolytic production of aluminum.

Ordinarily the Söderberg electrode is provided with a metal casing acting as a mould. The simplest shape of such electrodes is the circular, for the reason that the metal casing of a circular electrode is selfsustaining. For this reason Söderberg electrodes in aluminum pots prior to this invention have been circular and also the pots have been circular.

The applicant has found that the rectangular cross section has some important advantages as compared with the round section. He therefore installed electrodes of oblong cross sections and through years of investigations found that these electrodes give better results provided that they are rightly dimensioned.

The main drawback to a round electrode is that the circumference of the electrode is small as compared with the periphery of an oblong electrode of the same cross section. Consequently the gas which is developed at the lower end of the electrode in the aluminum pots during the electrolysis must escape at a smaller circumference when the electrode is round. The difference may be as much as 50% or more. For this reason the gas bubbles which form under a round electrode of a certain cross section tend to become considerably larger than underneath an oblong electrode, in correspondence with the smaller circumference. A round electrode also has a tendency to become overheated in its center portion, whereas with oblong electrodes of restricted widths there is less risk of overheating of the central part of the electrode owing to the better heat exchange between electrode and the furnace materials. The electrode consumption as well as the ampere efficiency of the pots, is unfavourably influenced by increasing temperature so that it is important to avoid any overheating of the central part of the electrode.

During operation the surface of the melted aluminum metal in the pot is not horizontal, but the metal seems to be moving all the time showing a considerable difference in level at various parts of the pot. A difference of as much as one-half inch has actually been measured. The condition is not static but is changing steadily. There seem to be waves in the metal the cause of which is not entirely clear. The waves may be caused by electro-magnetic forces, resulting in a rapid circulation of the metal. The applicant believes, however, that the more important cause of the waves is the escaping gas bubbles. At least the fact remains that the waves exist and that the same are important in the operation of the pot. It is easy to understand that such waves are formed very readily owing to the extremely small difference in specific gravities of the fluid aluminum and the fluoride bath from which the aluminum is electrolyzed. The specific gravity of the fluid aluminum metal is somewhat higher than that of the ordinary fluoride bath at a temperature of about 950–1000° C. which is ordinary operating temperature, whereas at lower temperatures the aluminum becomes lighter than the electrolyte and actually rises to the top when the bath is slowly cooled. The difference in specific gravities is therefore always very slight so that small influences suffice to stir up the metal very materially.

During the electrolysis the voltage of the aluminum pots is ordinarily kept between 4½–7 volts per pot. In order to have a good output of metal per kw. it is necessary to operate at the lowest possible voltage. Other conditions being equal it is only possible to lower the voltage by reducing the distance between the lower end of the anode and the aluminum metal acting as a cathode. However the anode must not at any time touch the metal as this will cause short circuit, thereby reducing the ampere efficiency. In actual operation it is desirable to obtain the smallest electrode distance from the melt at which the ampere efficiency is still good. This distance, however, is determined by the height of the waves in the metal. The waves in the surface of the aluminum therefore determine to a large extent the operating voltage of the pot. It is therefore important to find the best possible arrangement of the anode for elimination of the waves in the metal as far as possible.

Applicant has tried oblong electrodes of different shapes and compared them with the round electrodes. He has thereby found that it is important to limit the width of the cross section of the electrode to a maximum of about forty-three inches, whereas the other dimension may be of any size which is found practical, six to eight feet being perfectly acceptable. By dimensioning the electrode in this way it has been found that a minimum anode-cathode distance may be maintained even for the largest size pots whereby the operating voltage will be improved and no overheating will take place. Thereby it has been rendered possible to build pots of much increased size. The applicant has used 60,000 amperes on a single pot and is convinced that still much larger pots are possible in this way.

These oblong electrodes of restricted widths are ordinarily rectangular but it will be understood that any oblong electrodes having the dimensions above referred to, are useful.

The suspension of these oblong electrodes involves certain difficulties which applicant has solved in a very serviceable way. It is necessary not only to suspend the electrode securely and to allow it to be lowered little by little into the pot as it wears off at the lower end but also to reinforce the electrode so that it will not become deformed during operation owing to the hydrostatic pressure from the soft paste in the upper part of the electrode. A further object of the invention is, therefore, a suitable electrode holder for use in connection with these oblong electrodes. The electrode holder herein illustrated consists of a steel structure arranged in connection with contact studs which extend into the electrode at least from two opposing sides. These contact studs have previously been described in U. S. Patent No. 1,757,695. When the studs have been securely baked into the electrode they are very firmly connected with the baked part of the electrode, and offer an excellent means for suspension. However, as the electrode wears off the steel structure approaches the top of the fluid bath and it is necessary to remove the lowest part of the structure as well as the lowest set of studs, and to arrange the holder for suspension of the electrode from the set of studs next higher up. Before the suspension is changed however, it is necessary to make sure that the set of contact studs next higher up has been securely baked into the electrode, for which reason the electric current should be passed through these studs for a certain length of time before the suspension is changed and the lowest suspending structure is removed.

Further objects of the invention will appear as the specification progresses.

The accompanying drawing which forms a part of this application is schematic and illustrates one suitable form of the invention. No limitation on the invention is to be deduced therefrom.

In the drawing Figure 1 is a longitudinal elevation, partly broken away in vertical section, illustrating the invention as applied to an aluminum furnace in which two rectangular electrodes are employed;

Figure 1:
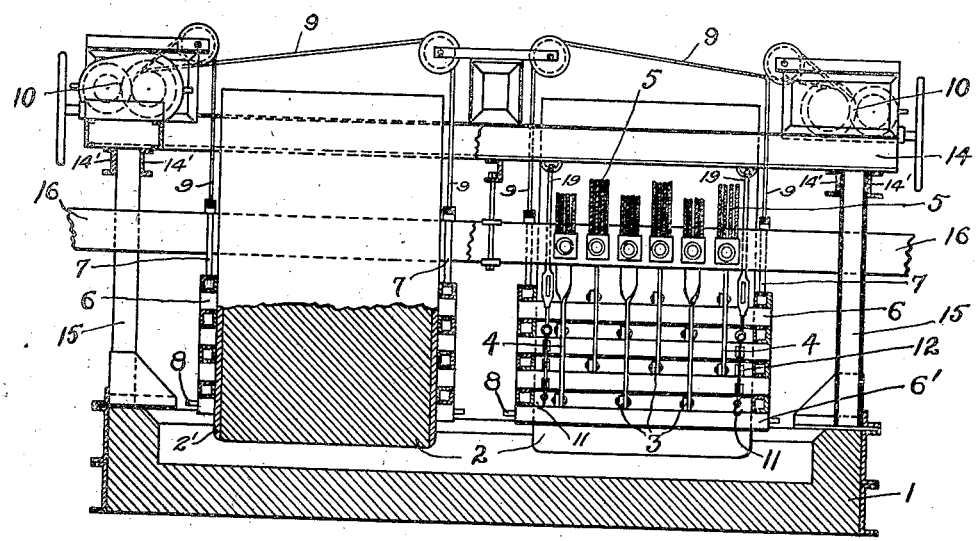
Figure 2:
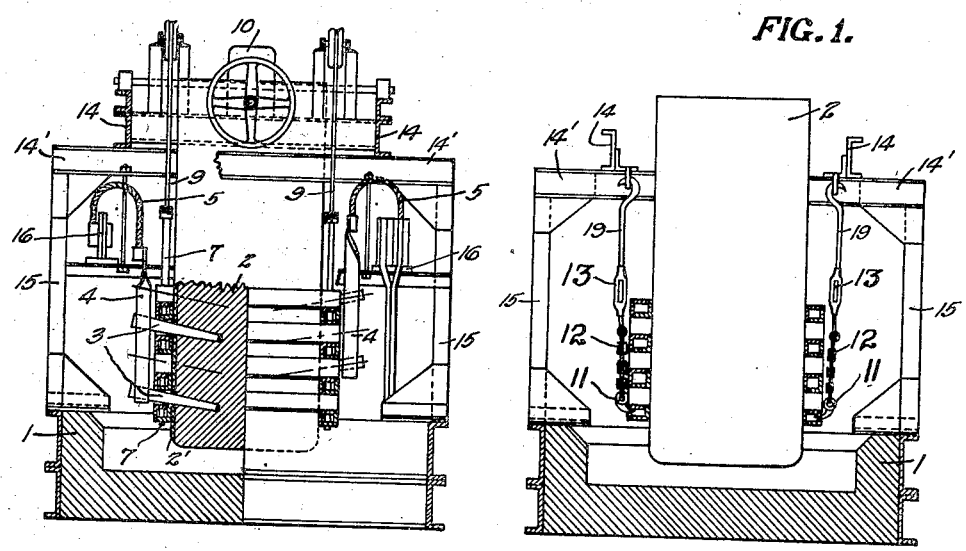
Fig. 2 is a front elevation, partly broken away in vertical section, of the furnace and apparatus of Fig. 1, illustrating primarily the electrode holder, its suspending means, the contact studs and their connection with the source of current.

The arrangement illustrated in Fig. 1 is of an aluminum pot with two Söderberg electrodes of restricted widths acting as anodes. The arrangement of two electrodes in one pot has the advantage that the part of the bath which is between the two electrodes stays very fluid so that the crust on top of the same is thin and can be broken up more easily than at the outside of the electrodes. It is even possible to operate at the pots in such a way as to work regularly only the part of the pot between the two electrodes, leaving the crust around the electrodes until the pot is tapped, when it should be broken up owing to the change in level of the bath during tapping.

The furnace 1 has mounted thereon a superstructure comprising upright beams 15—15 to which are attached at the top cross-beams 14'—14', which in turn support two beams 14—14 lying lengthwise of the furnace, one on each side of the electrodes 2—2.

The electrodes 2, of which two are illustrated, are of the Söderberg self-baking continuous type as heretofore referred to, are rectangular in cross section and are provided with a metallic casing 2'. Each of the electrodes is provided on two opposite sides with rows of metallic conductive contact studs 3—3. These studs are preferably arranged in rows in step formation as illustrated in Fig. 1, the rows, of which four are shown, being approximately six to twelve inches apart. The studs extend through the metallic casing of the electrodes into the interior thereof a sufficient distance to assure effective baking and heating of the electrode and to afford a rigid means for supporting the electrode in cooperation with the electrode holder. They project laterally from the electrode through the electrode holder and extend a sufficient distance therefrom for ready connection with the current supplying means.

Two bus bars 16—16 are suitably supported, one on each side of the electrodes, on the furnace superstructure above described. These lie longitudinally of the furnace and are preferably located about even with the top of the electrode holder. A plurality of copper bars 4—4, one set for each side of the electrodes, are suitably connected with the contact studs. As illustrated, these bars are vertically positioned and each connects in parallel the studs on its respective side of the electrode which are correspondingly placed in vertical line—as shown two studs for each bar of which ordinarily only the lower is attached to the bar, the upper stud being however, also attached for a time just before the suspension is changed to insure that it is securely baked into the electrode. Flexible cables 5—5 by suitable connections electrically connect the copper bars 4—4 with their respective cooperating bus bars 16—16.

Figure 4:
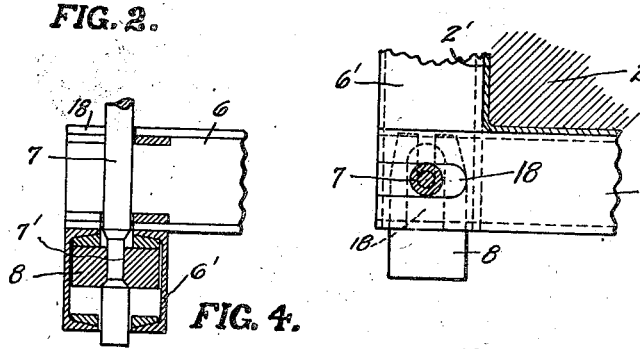
Figs. 4 and 5 are detail views illustrating means employed in assembling and locking the electrode holder of Fig. 1.
Figure 5:
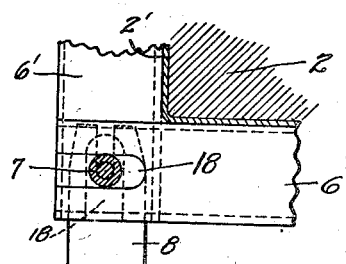

The electrode holder comprises alternately stacked beams 6—6, preferably made of iron and each consisting of two channel irons assembled as illustrated in Fig. 4. These beams overlap at their ends and completely surround the electrode. The beams at their overlapping ends are slotted lengthwise and centrally as at 18 and are interlocked by means of supporting bolts 7—7, one for each corner of the holder, which bolts are positioned in the slots 18 just mentioned, the slots being slightly wider than the bolts so that the bolts pass freely therethrough. These bolts at their bottoms bear circumferential grooves 7' for cooperation with key pieces 8—8, which are slotted at one end lengthwise and centrally as illustrated in Figs. 4 and 5, the width of the slots being substantially the same as the diameter of the grooved portion of the bolts. These keys are removable, and the structure as a whole is such that the lowest pair of beams of each holder may be removed as the electrode burns away on the end and the bolts attached as above described to the pair of beams next higher up.

The bolts 7—7 are each attached to cables 9—9, but insulated therefrom, which cables by suitable pulleys extend to and are operated by winches 10—10 of ordinary construction mounted upon the furnace superstructure above described, all in a manner which will be readily understood.

The electrode holder in the structure illustrated mechanically cooperates with the contact studs 3—3 in suspending the electrode. The lowest pair of the beams 6—6 on the sides of the electrode in which the studs are embedded are placed immediately beneath the lowest row of studs, so that this pair of beams supports the electrode from these contact studs. The contact studs in the rows above, prior to the transfer of the suspension thereto as above indicated, preferably carry no weight and are so positioned that the electrode holder in no way disturbs their initial embedding in the electrode mass of which the electrode is made.

Figure 3:
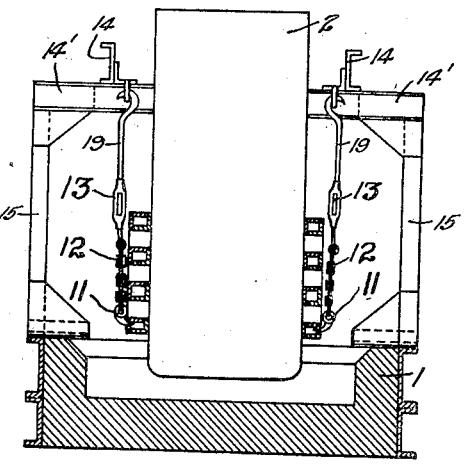
Fig. 3 is a fragmental view, partly in vertical section, illustrating primarily secondary supporting means for the electrode holder shown in Fig. 1.

During the removal of the lowest beams of the electrode holder and the attachment of the bolts 7—7 to the beams next above on the sides of the electrode in which the contact studs are embedded, it is necessary to support the electrode and the holder by other means than the bolts themselves, and secondary suspending means are herein illustrated for that purpose. These secondary suspending means comprise hooks 11—11 suspended on chains 12—12 which are connected with hooked rods 19—19 by turn buckles 13—13. The hooked rods 19—19 are suitably suspended as from the lengthwise beams 14—14 of the furnace superstructure heretofore referred to. These beams rest with their ends on the cross beams 14'—14'. The holder beams may be suitably apertured to offer adequate engagement for the hooks 11—11 therewith during the employment of the hooks in supporting the electrode and its holder, as illustrated in Fig. 3.

In operating a furnace equipped as above, the electrodes are raised or lowered to the desired position in the furnace as heretofore indicated and the desired distance between the aluminum metal on the furnace bottom and the electrodes maintained by means of the winches 10—10, which are preferably operated simultaneously to maintain an even distribution of the current through the two electrodes. When the bottom portions of the electrodes are burned away in use so that the lowest pairs of beams on the electrodes would be brought too close to the melt, the hooks 11—11 of the secondary suspending means are engaged with the pair of holder beams next above, and the lowest beams are removed, the key pieces 8—8 being withdrawn for this purpose. At this time also, it is desirable to remove the lowest rows of contact studs 3—3 unless they be made of such metal as would not contaminate the melt. While the hooks 11—11 of the secondary suspending means are thus engaged, it would be obvious that the electrode and its holder will be supported from the row of contact studs next above those originally supporting the holder. After the removal of the parts just indicated, the holder bolts 7—7 are raised by means of the winches until their flange portions 7'—7' are brought into proper position in respect to the pair of beams which now become the lowest beams of the holder, for cooperation with the key pieces 8—8, the key pieces are then inserted, and interlocking of the beams effected as will be readily understood. The secondary suspending hooks 11—11 are then disengaged and the control of the electrode and its holder resumed by the winches 10—10.

As the lowest beams are removed, the holder is built up at the top by connecting in with the bolts 7—7 the beams removed from the bottom or like beams, referred to comprehensively and broadly in the claims hereof as "similar" parts or beams. The slots 18 in the ends of the beams permit the latter to be slightly tilted and inserted between the bolts, and then dropped down into horizontal position in engagement with the bolts at the top of the stack without disturbing the bolts or their connection with the stack. In this way the structure of the holder is maintained. At the same time also contact studs similar to those removed from the bottom are embedded above in the unbaked portion of the electrode in the row formation above described, and the copper bars 4—4 are raised and connected into the studs above those originally connected.

When the copper bars 4—4 are being raised the electric current cannot flow through the disconnected stud but the other studs of the electrodes will maintain the supply of current so that the electrodes can operate altogether continuously all through the transformation of the holder.

The above example is given for illustrative purposes only and all parts of this application including the claims should be construed as widely as possible in view of the prior art.

Having thus described my invention what I claim is:—

1. An electrode for an aluminum furnace, baked in the furnace in which it is employed, and comprising a lower baked portion and an upper unbaked portion and having an oblong cross-section, the longest axis of which is in excess of forty-three inches and the shortest axis of which is approximately a maximum of forty-three inches.

2. An electrode assembly for an electric furnace, comprising in combination an electrode of oblong cross section having a lower baked portion and an upper unbaked portion and a metallic casing therefor, horizontal rows of contact studs independent of the casing and embedded in the two portions of the electrode, the studs of the several rows being in staggered formation, and means for connecting the corresponding studs of the horizontal and vertical rows in parallel.

3. An electric furnace electrode of oblong cross section, comprising a lower baked and an upper unbaked part, contact studs extending into the electrode from opposite sides thereof and arranged in horizontal rows, and an individual metal structure for each row of contact studs forming a frame surrounding the electrode, the metal structure being of such design as to withstand not only the weight of the electrode and the contact studs acting vertically through the lower studs, but also the horizontal pressure from the fluid paste in the upper part of the electrode.

4. An electrode holder comprising in combination alternately stacked corresponding and interchangeable beams overlapping at their ends and adapted to surround the electrode, means for effecting supporting engagement between the electrode and at least two of the beams, suspending means for the beams interlocking the overlapped ends, means for removably attaching the suspending means to the beams successively from the lowest beams upward, whereby as the electrode is burned off in use the lowest beams may be removed from the holder and similar beams added at the top as parts thereof and the suspending means attached to the then lowest beams of the holder.

5. An electrode holder for an electrode in which is embedded laterally projecting studs comprising in combination alternately stacked corresponding and interchangeable beams overlapping at their ends and adapted to surround the electrode in such relation thereto that at least two of the beams are positioned beneath the studs and cooperate therewith in supporting the electrode, suspending means for the beams interlocking the overlapped ends, means for removably attaching the suspending means to the beams successively from the lowest beams upward, whereby as the electrode is burned off in use the lowest beams may be removed from the holder and similar beams added at the top as a part thereof and the suspending beams attached to the then lowest beams of the holder.

6. An electrode assembly for an electric furnace, comprising in combination an electrode of rectangular cross section baked in the furnace in which it is employed and having a lower baked portion and an upper unbaked portion, a metallic shell surrounding the electrode mass comprising the electrode, an electrode holder encircling the metallic shell and reenforcing the shell to prevent deformation of the electrode from the hydrostatic pressure of the unbaked portion thereof, the said electrode holder being built up of a plurality of removable horizontal parts whereby the lowest parts may be removed as the holder approaches the melt in the furnace and similar parts added to the upper part of the holder to continue its structure, and removable studs penetrating the electrode and projecting laterally therefrom and cooperating with the holder in suspending the electrode.

7. An electrode assembly for an electric furnace, comprising in combination an electrode of rectangular cross section baked in the furnace in which it is employed and having a lower baked portion and an upper unbaked portion, a metallic shell surrounding the electrode mass comprising the electrode, an electrode holder encircling the metallic shell and reenforcing the shell to prevent deformation of the electrode from the hydrostatic pressure of the unbaked portion thereof, the said electrode holder being built up of a plurality of removable horizontal parts whereby the lowest parts may be removed as the holder approaches the melt in the furnace and similar parts added to the upper part of the holder to continue its structure, removable studs penetrating the electrode and projecting laterally therefrom and cooperating with the holder in suspending the electrode, and auxiliary means for suspending the electrode during the removal of the lowest parts therefrom, said auxiliary means functioning through and in cooperation with the electrode holder itself.

8. In operating an electrode for an electric furnace which electrode is of oblong cross section, comprises a lower baked portion and an upper unbaked portion and is provided with horizontal rows of contact studs embedded in the two portions of the electrode, the method which comprises suspending the electrode in the furnace from the lowest row of studs in the baked portion of the electrode, supplying current to the electrode through these studs and through the studs of the row next above thereby completing the baking of the said row next above into the electrode, transferring the suspension of the electrode to the row of studs next higher up, removing the lowest studs, and in turn embedding another row of studs above in the unbaked portion of the electrode.

PIERRE TORCHET.